United States Patent [19]

Suzuki

[11] 4,378,136
[45] Mar. 29, 1983

[54] CAP FOR ROTARY CELL

[76] Inventor: Takeshi Suzuki, 19, Hacchodori, 4-chome, Toyohashi, Aichi, Japan

[21] Appl. No.: 319,579

[22] Filed: Nov. 9, 1981

[30] Foreign Application Priority Data

Aug. 7, 1981 [JP] Japan .................. 56/101447[U]

[51] Int. Cl.³ .................................. F16C 33/66
[52] U.S. Cl. ............................. 308/187; 308/187.1; 184/105 B; 220/DIG. 19
[58] Field of Search .................. 220/200, DIG. 19; 308/187, 187.1; 184/105 B

[56] References Cited

U.S. PATENT DOCUMENTS

| | | | |
|---|---|---|---|
| 1,823,618 | 9/1931 | Magnuson | 184/105 B |
| 2,594,040 | 4/1952 | Le Clair | 184/105 B |
| 3,973,811 | 8/1976 | Noguera | 308/187.1 |
| 4,310,206 | 1/1982 | Weible | 184/105 B |

Primary Examiner—George T. Hall
Attorney, Agent, or Firm—Burgess, Ryan & Wayne

[57] ABSTRACT

A cap comprises a cap main body made of hard material having an injection hole at the center thereof. A rubbery membrane having a hole which is always closed is attached to the inside of the cap body. The cap prevents leakage of injected lubricant and entry of fibers or dust.

5 Claims, 4 Drawing Figures

CAP FOR ROTARY CELL

BACKGROUND OF THE INVENTION

The present invention relates to a cap for a rotary cell of a top roller.

In a top roller having a rotary cell rotatably attached by a needle or balls to each end of an arbor, a cap is provided at the end portion of each rotary cell to prevent entry of fibers or dust which may make rotation of the rotary cells impossible, and to prevent leakage of lubricant such as grease.

However, this cap is provided at the center with an oil supply hole which is always open, so that injected lubricant flows backward through the hole. This cap is also defective in that fibers or dust enters through the oil supply hole. Furthermore, since the oil supply hole projects inwardly by a considerable length to reduce the backward flow of the injected lubricant, the center of a rotary portion consisting of a needle or balls is offset relative to the center of the rotary cell. As a consequence, uneven rotation of the rotary cell will readily occur, which is a further defect of the conventional cap.

SUMMARY OF THE INVENTION

Therefore, one object of the present invention is to provide a cap for a rotary cell through which no lubricant leaks and by which entry of fibers or dust can be completely prevented.

Another object of the present invention is to provide a cap for a rotary cell in which the center of a rotary portion consisting of a needle or balls can coincide with the center of the rotary cell, since there is no part that projects inwardly.

According to the construction of the present invention, a cap comprises a cap main body which is made of hard material provided at the center with an injection hole for a lubricant and has a U-shaped section, and a rubbery membrane which has a hole which is always closed at a position opposite to the injection hole of the cap body and whose periphery is secured to the inside of the cap body.

DESCRIPTION OF THE PREFERRED EMBODIMENTS

Figure 1:
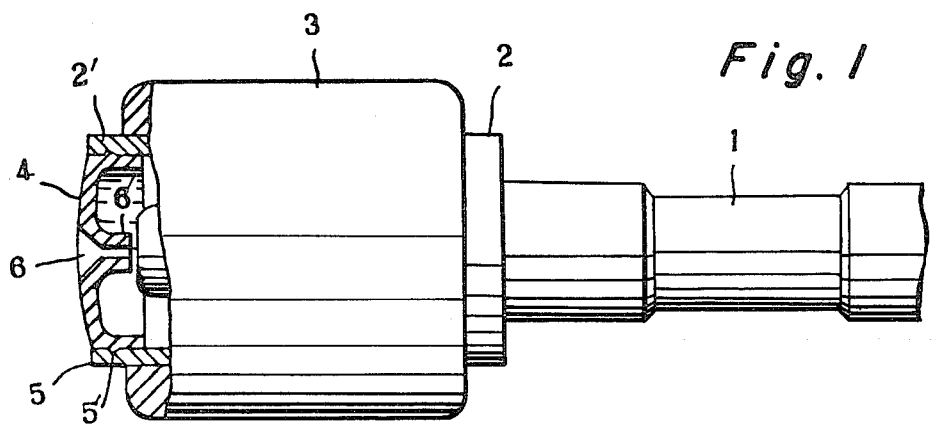
FIG. 1 is a partially cut away sectional view of a top roller in which conventional caps are used.

Before describing the embodiment of the present invention, a conventional top roller will be described. In a conventional top roller, a rotary cell 2 is rotatably attached to each end of an arbor 1 by a needle or balls (not shown), and a rubber cot 3 is secured around each rotary cell 2, as shown in FIG. 1.

In order to prevent entry of fibers or dust into the rotary cells 2 and leakage of lubricant such as grease in a top roller of this structure, a cap 4 is provided at the end portion of each rotary cell 2. This cap 4 has a collar 5 vertically projecting at the circumference thereof. A portion 5' of the collar 5 is extended outwardly and fits a groove 2' of the rotary cell 2. The cap 4 is provided at the center with an injection hole 6, an inner end 6' of which projects into the rotary cell 2 to prevent the lubricant injected into this hole 6 from flowing backward.

However, the injection hole 6 is always maintained open in the conventional cap 4 of such a construction. As a result, when a lubricant such as grease is injected with an injector, withdrawal of the injector will cause backward flow of the lubricant, which is one of the defects of this cap. It is also defective in that fibers or dust enters through the injection hole 6. In addition, since the inner end of the injection hole 6 projects into the rotary cell 2, the rotary cell 2 must be extended by the length of this projection. Therefore, the center of a rotary portion 1' which consists of the needle or balls attached to the arbor 1 is offset relative to the center of the rotary cell 2. For this reason, uneven rotation of the rotary cell 2 can easily occur.

Figure 2A:
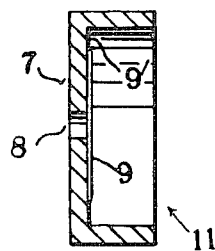
FIGS. 2(a) to 2(c) are, respectively, a sectional view of a cap of an embodiment according to the present invention, and perspective views of the front and rear sides of the same cap.
Figure 2B:
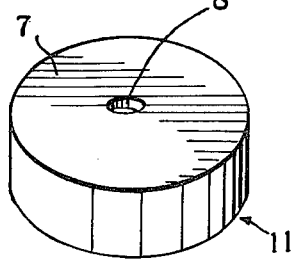
Figure 2C:
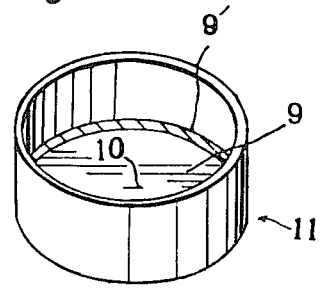

According to the present invention, a cap body 7 made of hard material such as metal or a synthetic resin and having a U-shaped middle section is provided at the center with an injection hole 8 for a lubricant, as shown in FIG. 2. A rubbery membrane 9 to which is secured a surrounding portion 9' is provided on the inner side of the cap body 7. In addition, a short slit 10 is formed in the portion of the rubbery membrane opposite to the injection hole 8 of the cap body 7.

Figure 3:
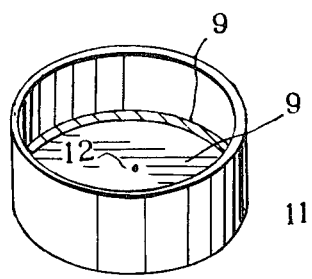
FIG. 3 is a sectional view of a cap of another embodiment according to the present invention.

In a cap shown in FIG. 3, the portion of the rubbery membrane 9 which is opposite to the injection hole of the cap main body is provided with a pinhole 12.

Figure 4:
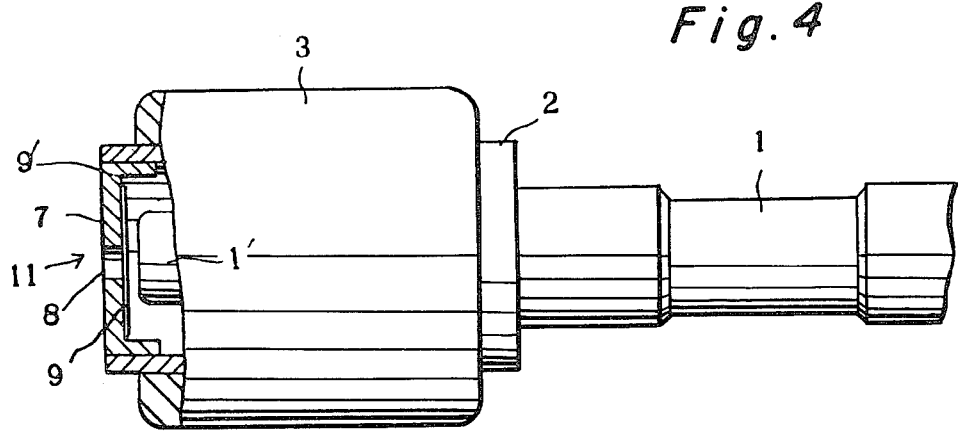
FIG. 4 is a partially cut away sectional view of a top roller in which a cap as shown in FIGS. 2 and 3 is attached to each rotary cell.

A cap of the structure shown in FIG. 2 or 3 is fitted and secured at the end portion of the rotary cell 2 as shown in FIG. 4, and the lubricant is injected therein with an injector. In this case, when the front end of the injector is inserted into the injection hole 8 of the cap main body 7 and further pushed into the interior of the cap main body 7, the slit 10 or the pinhole 12 of the rubbery membrane 9 is opened by the front end of the injector and the lubricant is injected through this opening. After the lubricant has been filled in the rotary cell 2, the injector is pulled out. The slit 10 or the pinhole 12 of the rubbery membrane 9 is then closed to completely prevent leakage of the lubricant. Furthermore, since the injection holes does not project inwardly, the interior of the rotary cell 2 is wider than in the conventional cap shown in FIG. 1 and therefore the rotary portion 1' of the arbor 1 can be made longer. As a result, in a top roller having a plurality of balls arranged in two rows, the distance between the rows of balls can be increased, so that the rotation of the rotary cell is advantageously stabilized as compared with conventional top rollers. Likewise, since the length of the needle can be increased in a top roller employing it in place of the balls, more stable rotation of the rotary cell can be achieved than with the conventional top rollers.

In summary, in accordance with the present invention, a cap comprises a cap main body made of hard material and having a U-shaped section, and a rubbery membrane. An injection hole is provided at the center of the cap body and a hole such as a slit or a pinhole which is always closed is provided at the position of the rubbery membrane opposite to the injection hole. As a result of this, the protection against leakage of the lubricant is improved. Furthermore, the length of the needle or the distance between the rows of balls can be increased, whereby the stability of rotation of the rotary cell is also improved.

What is claimed is:

1. A cap for a rotary cell comprising a cap main body which is made of hard material provided at the center with an injection hole for a lubricant and has a U-shaped section, and a rubbery membrane which is provided with a hole which is always closed opposite to said injection hole of said cap body and whose periphery is secured to the inside of said cap body, the portion of said cap body which is situated at a side of said rubbery membrane being attached to the end portion of said rotary cell.

2. A cap according to claim 1, wherein said cap main body is made of a metal.

3. A cap according to claim 1, wherein said cap main body is made of a synthetic resin.

4. A cap according to claim 1, wherein said hole which is always closed is a slit.

5. A cap according to claim 1, wherein said hole which is always closed is a pinhole.

* * * * *